US012411982B2

(12) United States Patent
Wang et al.

(10) Patent No.: US 12,411,982 B2
(45) Date of Patent: Sep. 9, 2025

(54) PRIVACY PRESERVING CUSTOM EMBEDDINGS

(71) Applicant: Google LLC, Mountain View, CA (US)

(72) Inventors: Gang Wang, Frederick, MD (US); Alexander E. Mayorov, Kirkland, WA (US)

(73) Assignee: Google LLC, Mountain View, CA (US)

( * ) Notice: Subject to any disclaimer, the term of this patent is extended or adjusted under 35 U.S.C. 154(b) by 153 days.

(21) Appl. No.: 18/388,763

(22) Filed: Nov. 10, 2023

(65) Prior Publication Data

US 2024/0202360 A1    Jun. 20, 2024

Related U.S. Application Data

(60) Provisional application No. 63/433,354, filed on Dec. 16, 2022.

(51) Int. Cl.
  *G06F 21/62*    (2013.01)
  *G06F 21/53*    (2013.01)

(52) U.S. Cl.
  CPC .......... *G06F 21/6245* (2013.01); *G06F 21/53* (2013.01)

(58) Field of Classification Search
  None
  See application file for complete search history.

(56) References Cited

U.S. PATENT DOCUMENTS 8,171,032 B2    5/2012  Herz
10,671,679 B2   6/2020  Wang et al.
(Continued)

FOREIGN PATENT DOCUMENTS

WO   WO 2022150428   7/2022
WO   WO 2022169447   8/2022
WO   WO 2022192148   9/2022

OTHER PUBLICATIONS

Blog.google [online], "Charting a course towards a more privacy-first web" Mar. 2021, retrieved from URL <https://blog.google/products/ads-commerce/a-more-privacy-first-web/>, 3 pages.
(Continued)

*Primary Examiner* — Christopher C Harris
(74) *Attorney, Agent, or Firm* — Fish & Richardson P.C.

(57) ABSTRACT

Methods, systems, and apparatus, including computer programs encoded on a computer storage medium, for selecting and distributing digital components to client devices in ways that protect user privacy and confidential data of content platforms and/or digital component providers are described. In one aspect, a method includes receiving, by a secure distribution system and from a client device of a user, a digital component request that includes, for each of multiple content platforms that distribute digital components to users, a corresponding user embedding comprising weights indicative of the relevance of multiple features to the user. The secure distribution system provides each user embedding as input to a respective isolated execution environment for the content platform corresponding to the user embedding, wherein the secure distribution system hosts each isolated execution environment. Digital component selection data generated based on the user embedding is received from each isolated execution environment.

20 Claims, 4 Drawing Sheets

(56) References Cited

U.S. PATENT DOCUMENTS

| | | | |
|---|---|---|---|
| 11,017,012 | B2 | 5/2021 | Javier et al. |
| 11,151,203 | B2 | 10/2021 | Natchu |
| 11,347,752 | B2 | 5/2022 | Wheeler |
| 11,574,207 | B2* | 2/2023 | Pearmain .................. G06N 7/01 |
| 11,868,429 | B1* | 1/2024 | Stone .................... G06N 3/0464 |
| 11,934,472 | B1* | 3/2024 | Ma ............................ G06N 3/08 |
| 2018/0204244 | A1 | 7/2018 | Roundtree |
| 2018/0268317 | A1* | 9/2018 | Dharwadker ....... G06F 16/9535 |
| 2020/0045008 | A1* | 2/2020 | Banothu ............ G06Q 30/0276 |
| 2020/0293568 | A1* | 9/2020 | Lu ...................... G06Q 30/0255 |
| 2022/0188698 | A1* | 6/2022 | Halecky ............. G06Q 30/0613 |
| 2022/0197961 | A1* | 6/2022 | Baek ....................... G06N 3/044 |
| 2022/0300999 | A1* | 9/2022 | Ortiz ....................... H04L 63/10 |
| 2022/0327401 | A1* | 10/2022 | Whitney ................. G06N 20/00 |
| 2024/0137427 | A1* | 4/2024 | Cai .......................... H04L 67/63 |

OTHER PUBLICATIONS

Developers.google.com [online], "Topics API Developer's Guide" Jan. 2022, retrieved on Jun. 14, 2024, retrieved from URL <https://developers.google.com/privacy-sandbox/relevance/topics/developer-guide>, 14 pages.

github.com [online], "FLEDGE.md" Jan. 2021, retrieved on Jun. 14, 2024, retrieved from URL <https://github.com/WICG/turtledove/blob/main/FLEDGE.md>, 64 pages.

Github.com [online], "FLEDGE_Key_Value_Server_API.md" Feb. 2022, retrieved on Jun. 14, 2024, retrieved from URL <https://github.com/WICG/turtledove/blob/main/FLEDGE_Key_Value_Server_API. md>, 15 pages.

Github.com [online], "FLOC" Aug. 2019, retrieved on Jun. 14, 2024, retrieved from URL <https://github.com/WICG/floc>, 7 pages.

Github.com [online], "README.md" Nov. 2020, retrieved on Jun. 14, 2024, retrieved from URL <https://github.com/google/ads-privacy/blob/master/proposals/scaup/README.md>, 11 pages.

International Search Report and Written Opinion in International Appln. No. PCT/US2023/037132, mailed on Feb. 20, 2024, 13 pages.

Investopedia.com [online], "What is EMA? How to Use Exponential Moving Average With Formula" Aug. 2000, retrieved on Jun. 14, 2024, retrieved from URL <https://www.investopedia.com/terms/e/ema.asp#:~:text=An%20exponential%20moving%20average%20(EMA)%20is%20a%20type%20of%20moving,the%20exponentially%20weighted%20moving%20average.>, 9 pages.

Wikipedia.org [online], "Autoencoder" created on Sep. 2006, retrieved on Jun. 14, 2024, retrieved from URL <https://en.wikipedia.org/wiki/Autoencoder>, 15 pages.

Wikipedia.org [online], "Bloom filter" created on Apr. 2004, retrieved on Jun. 14, 2024, retrieved from URL <https://en.wikipedia.org/wiki/Bloom_filter>, 25 pages.

Wikipedia.org [online], "Cryptographic hash function" created on Jan. 2004, retrieved on Jun. 14, 2024, retrieved from URL <https://en.wikipedia.org/wiki/Cryptographic_hash_function>, 15 pages.

Wikipedia.org [online], "Cuckoo Filter" created on Nov. 2018, retrieved on Jun. 14, 2024, retrieved from URL <https://en.wikipedia.org/wiki/Cuckoo_filter>, 3 pages.

Wikipedia.org [online], "Dimensionality reduction" created on Apr. 2004, retrieved on Jun. 14, 2024, retrieved from URL <https://en.wikipedia.org/wiki/Dimensionality_reduction>, 7 pages.

Wikipedia.org [online], "Half-precision floating-point format" created on Oct. 2004, retrieved on Jun. 14, 2024, retrieved from URL <https://en.wikipedia.org/wiki/Half-precision_floating-point_format>, 8 pages.

Wikipedia.org [online], "Secure multi-party computation" created on May 2004, retrieved on Jun. 14, 2024, retrieved from URL <https://en.wikipedia.org/wiki/Secure_multi-party_computation>, 13 pages.

\* cited by examiner

PRIVACY PRESERVING CUSTOM EMBEDDINGS

CROSS-REFERENCE TO RELATED APPLICATIONS

This application claims the benefit under 35 U.S.C. § 119(e) of U.S. Patent Application No. 63/433,354, filed Dec. 16, 2022. The disclosure of the foregoing application is incorporated herein by reference in its entirety for all purposes.

TECHNICAL FIELD

This specification is related to data processing, data privacy and security, and machine learning.

BACKGROUND

Data security and user privacy is vital in systems and devices connected to public networks, such as the Internet. The enhancement of user privacy has led many developers to change the ways in which user data is handled. For example, some browsers are planning to deprecate the use of third-party cookies.

SUMMARY

In general, one innovative aspect of the subject matter described in this specification can be embodied in methods including the operations of receiving, by a secure distribution system and from a client device of a user, a digital component request including, for each of multiple content platforms that distribute digital components to users, a corresponding user embedding including weights indicative of the relevance of multiple features to the user, wherein each user embedding is different from each other user embedding; providing, by the secure distribution system, each user embedding as input to a respective isolated execution environment for the content platform corresponding to the user embedding, wherein the secure distribution system hosts each isolated execution environment; receiving, from each isolated execution environment, digital component selection data generated based on the user embedding provided as input to the isolated execution environment; selecting, by the secure distribution system, a given digital component based on the digital component selection data received from each isolated execution environment; and sending, by the secure distribution system, the given digital component to the client device for presentation to the user. Other implementations of this aspect include corresponding apparatus, systems, and computer programs, configured to perform the aspects of the methods, encoded on computer storage devices.

These and other implementations can each optionally include one or more of the following features. In some aspects, the digital component selection data received from each isolated execution environment includes data identifying a selection parameter for a candidate digital component. Selecting the given digital component can include selecting the digital component from a set of candidate digital components based on the selection parameter received from each isolated execution environment.

In some aspects, the client device generates each user embedding based on user activity within one or more applications executed by the client device. Generating the corresponding user embedding for each content platform can include obtaining, for each event that occurs at the one or more applications, one or more features related to the event, obtaining, for each feature, a transformed feature using a transformation function of the content platform, and generating, using an aggregation function of the content platform, the user embedding based on the one or more features for each of multiple events.

In some aspects, the transformation function is configured to transform generic event-based features within a taxonomy of features to content platform specific features of a custom taxonomy of the content platform. Obtaining the one or more features related to the event can include providing information related to the event as input to a machine learning model executed by the client device and receiving the one or more features as an output of the machine learning model. In some aspects, the transformation function includes a machine learning model.

In some aspects, obtaining the transformed feature for each feature can include sending each feature to one or more retrieval servers and receiving each transformed feature from the one or more retrieval servers. The one or more retrieval servers can include a set of multi-party computation servers. Sending each transformed feature can include sending a respective secret share of each transformed feature to each multi-party computation server.

Particular embodiments of the subject matter described in this specification can be implemented so as to realize one or more of the following advantages. Custom user embeddings can be generated at client devices of users in ways that enable content platforms to customize the information represented by the embeddings and to use data related to multiple events while obviating the need to send sensitive user data from the client devices, which enhances user privacy while still enabling the delivery of highly relevant and custom content to the users. By generating the embeddings at the client devices, sensitive user information related to events that occur at multiple applications and at multiple websites remains on device and is not broadcast to the online ecosystem. This enables effective custom content delivery even after third party cookies are deprecated.

Features related to events can be determined prior to the events occurring using servers and such features can be provided to client devices in privacy preserving ways, e.g., by storing data that maps events to features at the client devices or by providing the features in response to queries to a secure retrieval server. This reduces the computational burden placed on client devices and reduces the associated memory, battery, and bandwidth consumption that would otherwise be required by the client device to evaluate each event, e.g., using a machine learning model, to determine features for each event.

Content platform specific transformation functions can be used to transform generic features that apply to all parties to custom transformed features of the content platform's taxonomy. This enables the content platform to use existing and/or custom logic to determine digital component selection data for use in selecting digital content, e.g., digital components, to provide to users based on features related to events of the user, rather than being limited to generic features that may not enable the content platform to effectively determine the digital component selection data. The transformed features can be determined using similar on device mapping techniques or secure queries as the other features to reduce the computational burden placed on lower power client devices and to preserve user privacy.

The details of one or more embodiments of the subject matter described in this specification are set forth in the

BRIEF DESCRIPTION OF THE DRAWINGS

Like reference numbers and designations in the various drawings indicate like elements.

DETAILED DESCRIPTION

In general, this document describes systems and techniques for selecting and distributing digital components to client devices in ways that protect user privacy and confidential data of content platforms and/or digital component providers. A secure distribution system can be configured to perform digital component selection processes that use sensitive user data so that the user data is not provided to any other entity. The secure distribution system can host and execute selection logic of various content platforms when selecting digital components based on user data in manners that ensure that no other entity can access the selection logic of the content platform. In this way, both the data of the users and the content platforms is kept secure.

The secure distribution system can execute the selection logic of each content platform in isolated environments that isolate the code from code of other content platforms. The isolated environments can be sandbox environments, e.g., in the form virtual machines, that controls what information is provided to the isolated environments and what information is allowed to be sent from the isolated environments and where such information can be sent. This prevents content platforms from leaking sensitive user information from the secure distribution system.

The selection logic of a content platform can be configured to generate digital component selection data that is used by the secure distribution system to select a digital component from multiple digital components. The digital component selection data can include a selection parameter, e.g., an amount that the content platform is willing to provide to a publisher for the presentation of a digital component with an electronic resource of the publisher. The selection logic can be configured to generate the digital component selection data based on a user embedding that represents the relevance of multiple features to the user. These features can include, for example, topics of interest (e.g., fishing, gardening, etc.), user characteristics (e.g., inferred demographic information), and/or other appropriate features related to users. As described in more detail below, client devices of users can be configured to generate a custom user embedding for each of multiple content platforms.

Figure 1:
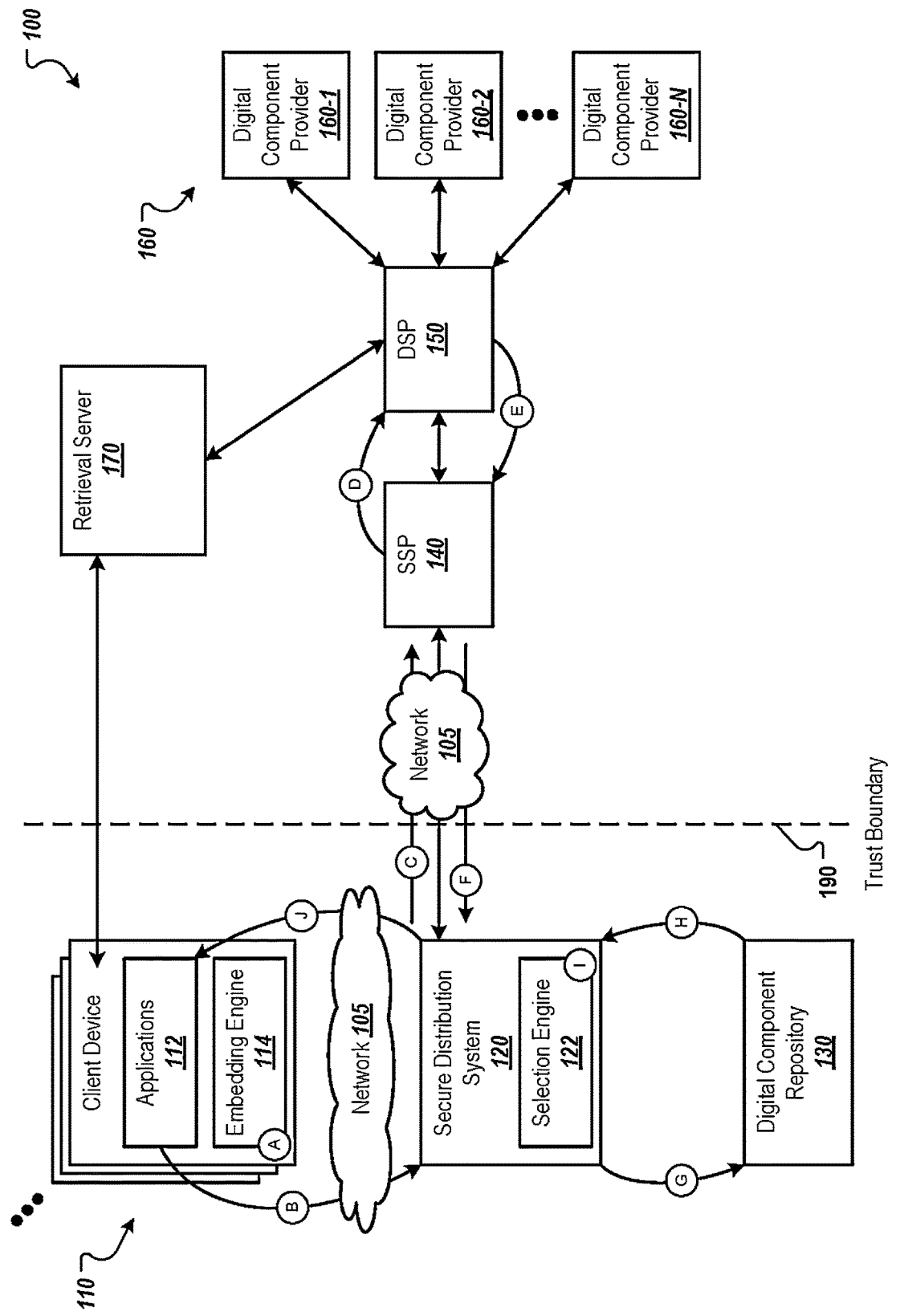
FIG. 1 is a block diagram of an example environment in which a secure distribution system distributes digital components to client devices in a privacy preserving manner.

FIG. 1 is a block diagram of an example environment 100 in which a secure distribution system 120 distributes digital components to client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to the secure distribution system 120 and connects the secure distribution system 120 to content platforms, such as supply side platforms (SSPs) 140 and/or demand side platforms (DSPs). The network 105 can also connect the various content platforms to one another and/or to digital component providers 160, e.g., to servers of the digital component providers 160. The network 105 can also connect client devices 110 and content platforms to a retrieval server 170.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request that requests a digital component for presentation in the digital component slot. In some implementations, the digital component slot and/or the resource can include code (e.g., scripts) that cause the application 112 to request a digital component from the secure distribution system 120.

A digital component request sent by a client device 110 can include sensitive user data related to a user of the client device 110 and/or non-sensitive data. The sensitive user data can include, for example, user embeddings that represent the relevance of features to the user of the client device 110. For example, a user embedding can be in the form of a vector, table, or other appropriate data structure that includes an element for each feature of a set of features. Each element can include a weight for a particular feature. The weight for a feature can indicate the relevance of the feature to the user and can be based on events that occur at the client device 110, as described below.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A digital component request can also include contextual data, which is generally considered non-sensitive. The contextual data can describe the environment in which a selected digital component will be presented. The contextual data can include, for example, coarse location information indicating a general location of the client device 110 that sent the digital component request, a resource (e.g., website or native application) with which the selected digital component will be presented, a spoken language setting of the application 112 or client device 110, the number of digital component slots in which digital components will be presented with the resource, the types of digital component slots, and other appropriate contextual information.

The secure distribution system 120 can be implemented using one or more server computers (or other appropriate computing devices), that may be distributed across multiple locations. In general, the secure distribution system 120 receives requests for digital components from client devices 110, selects digital components based on data included in the requests, and sends the selected digital components to the client devices 110.

As the secure distribution system 120 receives sensitive user data, the secure distribution system 120 can be operated and maintained by an independent trusted party, e.g., a party that is different from the users of the client devices, the parties that operate the SSPs 140 and DSPs 150, and the digital component providers 160. For example, the secure distribution system 120 can be operated by an industry group or a governmental group.

As described in more detail below, the secure distribution system 120 can select a digital component from a set of digital components stored (or for which digital component data is stored) in a digital component repository 130 and/or a set of digital components received from an SSP 140. The digital component repository 130 stores digital components received from content platforms (e.g., from SSPs 140 and/or DSPs 150) and additional data (e.g., metadata) for each digital component. The metadata for a digital component can include, for example, distribution criteria that defines the situations in which the digital component is eligible to be provided to a client device 110 in response to a digital component request received from the client device 110 and/or a selection parameter that indicates an amount that will be provided to the publisher if the digital component is displayed with a resource of the publisher and/or interacted with by a user when presented. For example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations). Other data that can be used to select a digital component can also be stored in the digital component repository with a reference (e.g., a link or as metadata) to its digital component.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create (or otherwise publish) digital components that are presented in digital component slots of publisher's resources.

In this example, user data does not cross a trust boundary 190 that separates the client device 110, the secure distribution system 120, and the digital component repository from the SSP 140, DSP 150, and digital component providers 160. In this way, no entity other than the client device 110 and the secure distribution system 120 receives the user data that is included in a digital component request. This preserves user privacy and data security, especially when compared to techniques that employ third party cookies to send user data across the Internet.

An example process for selecting and providing a digital component for presentation at a client device 110 is illustrated in stages A-J, which illustrate a flow of data between the components of the environment 100.

In stage A, the client device 110 of a user generates a user embedding for each of multiple content platforms, e.g., for each of multiple DSPs 150. As described above, a user embedding represents the relevance of multiple features to the user. Each content platform can have custom user embeddings with a custom set of features, a custom arrangement of such features, and custom techniques for generating the weights represented by the user embedding. The client devices 110 can include an embedding engine 114 that is configured to generate the user embeddings for multiple content platforms. The embedding engine 114 can be an engine of another application 112 or a stand alone application that runs on the client device 110.

In general, the client device 110 can obtain a set of one or more features for events that occur at the client device 110. Examples of events include a visit to an electronic resource and user activity within an application or other resource (e.g., selection of a presented user interface element, reaching a level in a game, viewing particular content, and so on). The features for an event can include topics related to the event and/or inferred user characteristics for the event. For example, a web page resource can be related to one or more topics, e.g., based on the content presented by the web page. In a particular example, a web page about fishing in Alaska can be related to the topics of fishing, outdoors, and Alaska. User characteristics can also be inferred based on such content or topics. For example, it can be inferred that a user that visits a web page with clothing for tall men is a tall man.

In some implementations, the client device 110 (e.g., the embedding engine 114) can use a machine learning model. For example, the client device 110 can obtain the features by providing information about the event as input to a machine learning model that is executed by the client device 110. The machine learning model can be trained to output a set of one or more features and optionally a confidence level for each feature based on the information about the event. The confidence level can indicate a level of confidence that the event is related to the feature or a level of relevance of the feature to the event. The information about the event can include a resource locator for the resource at which the event occurred, the content of the resource (e.g., text and/or images presented by the resource), a time at which the event occurred, an identifier of an application 112 with which the event occurred, and/or other appropriate information related to the event. A resource locator can be in the form of a Universal Resource Locator (URL), a Universal Resource Identifier URI), or another appropriate form that uniquely identifies a resource among multiple resources.

In some implementations, the features for at least some types of events are determined prior to the events occurring. For example, the retrieval server 170 can be configured to crawl electronic resources to obtain information about the resources. The retrieval server can then provide the information to a machine learning model that is trained to output features based on the information. As the retrieval server 170 can include more processing power than a typical client device 110, the machine learning model can be more complex (e.g., include more layers and/or neurons if implemented as a neural network) and more accurate than the machine learning models that execute on client devices 110. This allows for more accurate features associated with events.

To obtain the features for each event, the client device 110 can store data that maps events to features, e.g., by downloading such data from the retrieval server 170. For example, the client device 110 can store a table that includes a row for each event and columns for features. The cell in a particular row and a particular column can include the confidence level for the event of the particular row and the feature of the particular column. The client devices 110 can be configured to download the data that maps events to features periodically based on a specific time period. In another example, the retrieval server 170 can push the data to the client devices 110 periodically or in response to changes in the data.

In another example, the features can be embedded in the resources. For example, each resource can include metadata for each of one or more events that can occur with respect to the resource. This can reduce the storage requirements of the client devices 110 for storing the table, but may involve updating the resources or servers that provide the resources to client devices 110.

In this example, the retrievals server 170 can periodically crawl resources and infer features of the resources as part of the crawling process. For each static page, the retrieval server 170 can create a record that includes a set of data that includes, for example, an expiration data for the record, a version identifier that identifies a version of the machine learning model used to infer the features of the resource, the resource locator for the resource (e.g., URL or URI), the identifier of the retrieval server 170, a cryptographic hash of the static page content (e.g., the <body> section of an HTML web page), the inferred features, and/or other appropriate information. The record can also include a digital signature generated over the set of data. The retrieval server 170 can then send the record to the publisher of the resource. When the client device 110 requests the resource, the publisher's server can attach the record to the response to the request, e.g., in an HTML header or a <meta> tag in an HTML web page for web page resources. Upon receiving the response, the client device 110 extracts the record, verifies the digital signature, verifies the expiration date in the record if present, and verifies that the cryptographic hash in the record matches the actual content fetched. If all verifications succeed, the client device 110 considers the record authentic and can store the features for the event for use in generating user embeddings.

In yet another example, the client device 110 can be configured to request the features for events that have occurred at the client device 110. To reduce the number of requests sent to the retrieval server 170, the client device 110 can be configured to send a batch request that includes the information for multiple events that have occurred over a given time period, e.g., each hour, every other hour, each day, or another appropriate time period.

In implementations in which the client device 110 provides information about events that occurred at the client device 110 to the retrieval server 170, care should be taken to ensure that such information is not leaked to other entities and that the retrieval server 170 is not able to generate a user profile for the user that includes information across multiple requests. In one example, the retrieval server 170 can be implemented as a cluster of multi-party computation (MPC) servers that retrieve the features using private information retrieval techniques. In particular, the client device 110 can send, for each event, a first secret share of the information for the event to a first MPC server and a respective secret share of the information to each one or more second MPC servers of the MPC cluster. In this way, an entity that obtains a request sent to one of the MPC servers would not be able to access the information for the events in cleartext. The MPC servers can perform a secure MPC process to obtain the features for each event based on the information for the event and provide secret shares of the features to the client device 110. Using the secure MPC process, neither MPC server can access the information about the events or features in cleartext absent unauthorized collusion between the MPC servers. The client device 110 can combine the secret shares to obtain the features in cleartext. Cleartext is text that is not computationally tagged, specially formatted, or written in code, or data, including binary files, in a form that can be viewed or used without requiring a key or other decryption device, or other decryption process.

In another example, the retrieval server 170 can use a cryptographic algorithm to hash a resource locator to a wide but limited number of buckets such that there are N resource locators per bucket. Each bucket can include a random or pseudorandom set of resource locators mapped to their features, which can be computed offline. The resource locators may not be grouped by topic or any other information within each bucket. In this example, the client device 110 can generate and send a hashed key for an event (e.g., a hash of a resource locator of a viewed resource) to the retrieval server 170 and receive a set of resource locators mapped to topics which randomly grouped without the retrieval server 170 being able to determine the resource locator of the event that occurred at the client device 110. The client device 110 can select, from the set of resource locators, the resource locator of the event that occurred at the client device 110 and obtain the features mapped to that resource locator. The client device 110 can store the features for use in generating the user embeddings.

In another example, the client device 110 can request, from the retrieval server 170, topics for multiple resource locators at each request. The multiple resource locators can include one real resource locator for an event that occurred at the client device 110 and one or more fake resource locators that do not correspond to an event that occurred at the client device 110. The client device 110 can be configured to select the fake resource locators randomly or pseudorandomly. The retrieval server 170 can return the features for each resource locator in the request without knowing which resource locator corresponds to an actual event that occurred at the client device 110. Thus, the retrieval server 170 would be unable to generate an accurate user profile of the user across multiple requests. The client device 110 can obtain the features returned by the retrieval server 170 for the one real resource and store these features for use in generating the user embeddings.

The features for an event can be represented using a vector that includes a set of elements. This vector can be referred to as an event feature vector. Each element in the event feature vector can correspond to a feature and include the level of confidence for that feature. A machine learning model running on the client device 110 or the retrieval server 170 can be configured to generate the vector based on the information related to the event.

The client device 110 can store the features in a cache or other appropriate data storage of the client device 110. For each feature, the client device 110 can also store a weight for the feature and the level of confidence for the feature. For example, the client device 110 can determine the weight for a feature based on an amount of time that has passed since the event for the feature occurred. In a particular example, the client device 110 can use a decay function to reduce the weight for a feature over time.

Content platforms can use different features when selecting digital components or distribution criteria for digital components. For example, a content platform can have specific topics of interest that differ from topics represented by features generated by the retrieval server 170 or a machine learning model running on client devices. The client devices 110 (e.g., the embedding engine 114) can be configured to transform features for events to transformed features for each content platform, e.g., for each DSP 150.

In some implementations, the embedding engine 114 uses content platform specific transformation functions to transform features for events to transformed features for the content platforms. An example transformation function can map a particular feature to one or more particular transformed features. For example, a transformation function can specify that the feature "fishing" maps to the transformed features of "outdoors enthusiast" and "fishing enthusiast." The transformation function can also transform the confidence level to a transformed confidence level.

The transformation function for a content platform can be in the form of a machine learning model, e.g., a linear model or a neural network. The machine learning model can be trained to output transformed features and their corresponding confidence levels based on input features and their corresponding confidence levels. For example, the input can be an event feature vector and the output can be a transformed event feature vector for the event. The transformed event feature vector can include an element for each transformed feature in the content platform's taxonomy of features. The element for a transformed feature can include the confidence level for that transformed feature.

Each content platform can provide its transformation functions to the client devices 110 or to the retrieval server 170. If the transformation functions are used by the retrieval server 170 rather than the client devices 110, the client devices 110 can provide the features for an event to the retrieval server 170 with a request for transformed features. As this information can be used to generate a user profile for a user, similar techniques as those described above can be used to prevent such profiling. For example, the client device 110 can generate and send secret shares of the features to MPC servers and the MPC servers can return secret shares of the transformed features to the client device 110.

If the client device 110 executes machine learning model transformation functions, the complexity of the machine learning models can be limited to prevent some content platforms from unfairly dominating the computational power of the client device 110 and to limit the computation and storage costs associated with the machine learning models. For example, the embedding engine 114 can require that each neural network is limited to a specified number of layers and/or neurons.

The client device 110 can store the transformed features for each content platform in a cache or other appropriate storage of the client device 110. For example, the client device 110 can store, for each content platform, a table or other appropriate data structure that includes the transformed event feature vector for each event that occurred, e.g., over a given time period, for use in generating a user embedding for the content platform. The given time period can be the previous 24 hours, the previous week, the previous month, or another appropriate time period. The client device 110 can also store a weight for each transformed event feature vector based on the amount of time that has lapsed since the event corresponding to the vector occurred, similar to the weights of the event feature vectors.

In some cases, the embedding engine 114 can limit the features that a content platform can use in generating transformed features and user embeddings. For example, a content platform may only have access to features related to resources for which the content platform received a contextual request (as described below). In such cases, the embedding engine 114 is configured to generate, for each content platform, only transformed features for features that the content platform has access.

The embedding engine 114 can generate a user embedding for each content platform based on the transformed features generated for the content platform. The embedding engine 114 can use the transformed features across multiple events, e.g., events that occur during the given time period for which transformed features are stored, to generate the user embedding for the content platform. The multiple events can include events that occur at multiple resources (e.g., multiple web pages hosted by different domains) and/or events that occur using multiple applications (e.g., one or more browser and/or one or more native applications) that run on the client device 110.

The embedding engine 114 can generate the user embedding for a content platform using an aggregation function selected by or provided by the content platform. For example, an entity that manages the secure distribution system 120 can provide a set of default aggregation functions that are configured to generate user embeddings based on transformed features and their corresponding confidence levels and/or weights. These aggregation functions can have configurable aspects that enable the content platforms to customize the aggregation functions. For example, an aggregation function can use an exponential moving average technique to generate weights for features using the transformed features. Exponential moving average techniques place greater weight and significance on features for more recent events, and gradually forgets the features of older events by assigning less weight and significance to these features over time. Thus, for exponential moving average implementations, the transformed features can be stored with timestamp data that indicates a time at which the event corresponding to the transformed features occurred.

To customize an exponential moving average based aggregation function, the content platforms can specify the smoothing factor of the aggregation function. The larger the smoothing factor, the more weights and significance the most recent events will carry, and the faster that the function forgets historical events. By limiting the maximum allowed smoothing factor, it limits the amount of user data derived from events that can be leveraged by the selection logic of content platforms.

An aggregation function can also be in the form of a machine learning model. For example, a content platform can provide, to the client devices 110, a trained machine learning model that is trained to generate a user embedding based on transformed features and their corresponding weights and/or confidence levels. As described above, a user embedding represents the relevance of features to the user of the client device 110. For example, the elements of the user embedding can include a weight that indicates a relevance of a feature to the user. The weight for a feature can be computed using the aggregation function.

In stage B, the application 112 sends a digital component request to the secure distribution system 120. As described above, the application 112 can send a digital component request to request a digital component for presentation in a digital component slot of a resource being presented by the application 112. The digital component request can include the user embeddings for one or more content platforms and contextual data.

In stage C, the secure distribution system 120 sends a context-based digital component request to an SSP 140. The context-based digital component request can include the contextual data of the digital component request received from the application 112. However, the context-based digital component request does not include any user data, e.g., does not include any user embedding. The secure distribution system 120 can temporarily store the user embeddings while waiting for a response from the SSP 140. The secure distribution system 120 can send the context-based digital component request to an SSP 140 for the publisher of the resource being presented by the application 112.

In stage D, the SSP 140 forwards the context-based digital component request to one or more DSPs 150. In stage E, each DSP 150 sends, to the SSP 140, one or more selection parameters for one or more digital components, e.g., digital components stored in the digital component repository 130. For example, the DSP 150 can select a digital component based on the contextual data of the context-based request and determine a selection parameter for the digital component based on the contextual data. The DSP 150 can also provide a digital component and selection parameter, e.g., a digital component that is not stored in the digital component repository 130. Each DSP 150 can send a selection parameter with data indicating the digital component to which the selection parameter applies. The digital components for which selection parameters are provided by the DSPs 150 can be referred to as context-based digital components.

In stage F, the SSP 140 sends the digital components and/or selection values to the secure distribution system 120. In some implementations, the SSP 140 can filter digital components and/or selection parameters prior to sending the digital components and/or selection values to the secure distribution system 120. For example, the SSP 140 can filter digital components and/or selection parameters based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In stage G, the secure distribution system 120 queries the digital component repository 130 for a set of candidate digital components. These candidate digital components can be selected based on user data (e.g., the user embeddings) and/or contextual data. For example, the secure distribution system 120 can submit a query that defines, as conditions of the query, the user data of the digital component request. In some implementations, the query can also include context-based conditions. For example, a query can request retrieval of digital components that include, as distribution criteria, a particular user group and/or a particular geographic location. Although shown after stages C-F, the secure distribution system 120 can query the digital component repository in parallel with these stages to reduce the latency in selecting and providing a digital component to the application 112.

In stage H, the secure distribution system 120 receives a set of candidate digital components from the digital component repository 130 and a selection parameter for each candidate digital components. The set of candidate digital components can include those having distribution criteria that matches the conditions of the query.

In stage I, a selection engine 122 of the secure distribution system 120 selects a digital component to provide to the application 112 for presentation in the digital component slot. The selection engine 122 can select a digital component from the set of context-based digital components and the candidate digital components retrieved from the digital component repository 130.

The selection engine 122 can use a secure workflow that enables the use of custom selection logic of content platforms to generate digital component selection data for use in the selection process. The secure workflow can include multiple stages and at least some of the stages can be customized for each content platform. For example, the secure workflow can include a stage in which selection parameters are generated for candidate digital components based on the user embeddings. As the user embeddings and selection logic of content platforms are confidential data, the selection engine 122 can execute the selection logic in isolated execution environments.

In some implementations, the selection engine 122 can be configured to initiate an isolated execution environment for each content platform. An isolated execution environment can be in the form of a virtual machine or other sandbox environment for which the selection engine 122 can control the information provided to and sent from the isolated execution environment.

In the isolated execution environment, selection logic of the content platform can be executed to generate a selection parameter for a digital component based on the user embedding for the content platform. For example, the selection engine 122 can initiate a virtual machine for the content platform and pass the user embedding received for that content platform to the virtual machine. The virtual machine can execute the selection logic of the content platform using the user embedding to generate the selection parameter for each of one or more candidate digital components of the content platform. The selection logic can be in the form of a set of rules, a machine learning model, or another appropriate type of computer-executable logic.

The selection engine 122 can receive digital component selection data from each isolated execution environment. The digital component selection data can include data identifying one or more candidate digital components of the content platform and, for each candidate digital component, a selection parameter. The selection engine 122 can select the digital components from the candidate digital components and the context-based digital components based on the selection parameter for each digital component in the two sets. For example, the selection engine 122 can select the digital component having the highest selection parameter.

In stage J, the secure distribution system 120 provides the selected digital component to the application 112. The application 112 can then present the digital component with the resource being presented by the application 112.

Figure 2:
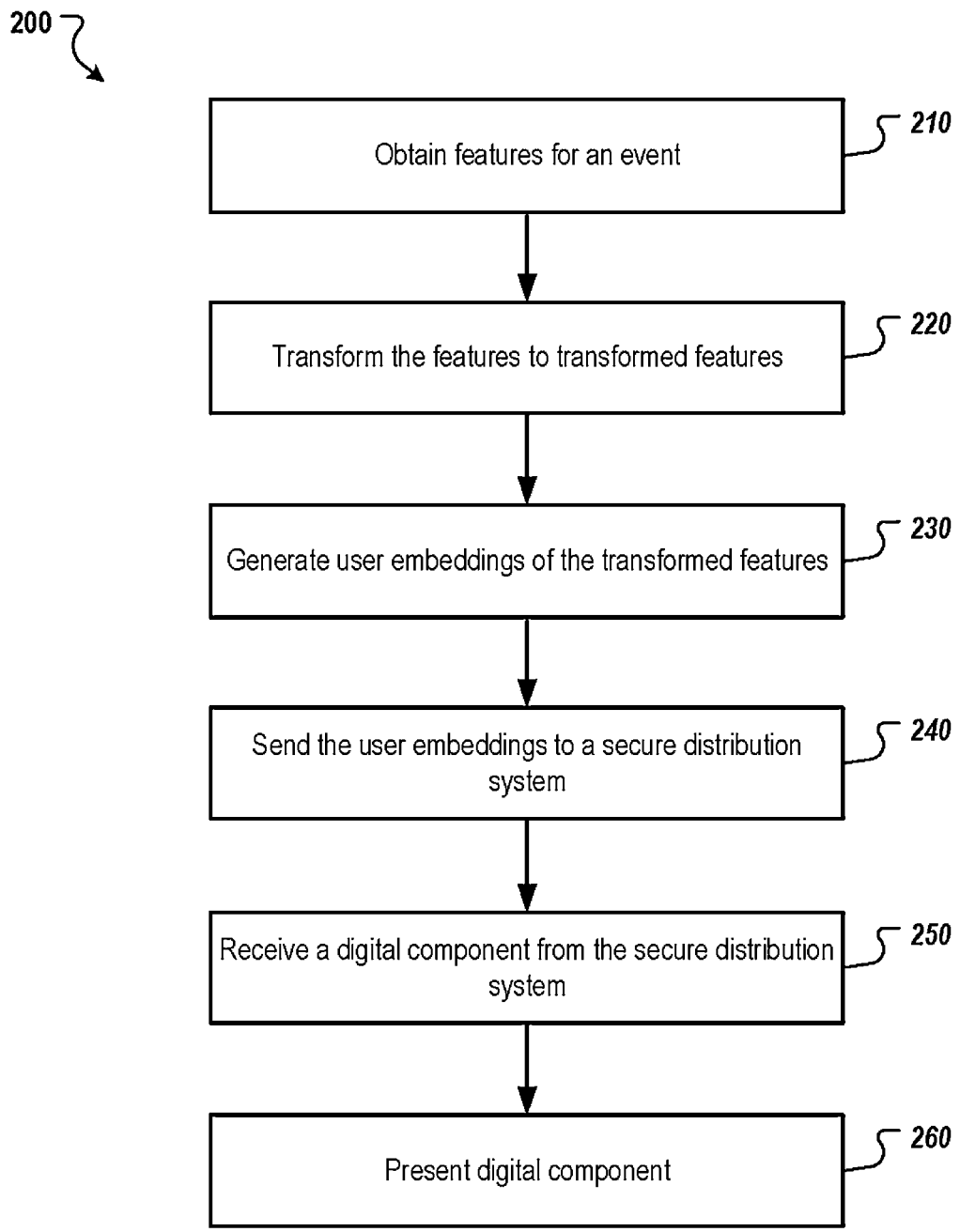
FIG. 2 is a flow diagram of an example process for generating user embeddings.

FIG. 2 is a flow diagram of an example process 200 for generating user embeddings. Operations of the process 200 can be performed by a client device e.g., the client device 110 of FIG. 1. Operations of the process 200 can also be implemented as instructions stored on one or more computer readable media, which may be non-transitory, and execution of the instructions by one or more data processing apparatus can cause the one or more data processing apparatus to perform the operations of the process 200.

Features for an event are obtained (210). An embedding engine 114 running on a client device 110 can be configured to detect events that occur at the client device 110. For example, the embedding engine 114 can be an engine of an application 112 and can detect events that occur within that application 112. In another example, the embedding engine 114 can be configured to receive information about events from one or more applications 112. In this example, each application 112 can be configured to send information about detected events that occur in the application 112.

The embedding engine 114 can obtain the features for an event locally or from a retrieval server 170. For example, as described above, a local machine learning model can be trained to generate features and corresponding confidence levels based on the information about the event. In another example, the embedding engine 114 can provide the information about the event along with a request for the features to the retrieval server 170. In yet another example, the information about an event can be included with data that is provided to the client device 110 with a resource requested by the client device 110.

The features for the event are transformed (220). As described above, the embedding engine can use a transformation function for each of multiple content platforms to generate transformed features and confidence levels for each content platform based on the features for an event.

A user embedding is generated for each content platform (230). The embedding engine 114 can generate a user embedding for a content platform using an aggregation function for the content platform. For example, the embedding engine 114 can provide a set of transformed features for the content platform and their corresponding confidence level as input to the aggregation function for the content platform. The aggregation function can generate a user embedding that includes weights that indicate the relevance of features to the user of the client device 110.

The user embeddings are sent to a secure distribution system (240). For example, the client device 110 can send the user embeddings for multiple content platforms to the secure distribution system 120 along with a digital component request that requests one or more digital components. As described above, this request can also include contextual data.

A digital component is received from the secure distribution system (250). The secure distribution system 120 can select one or more digital components based on the user embeddings and/or the contextual data and provide the digital component(s) to the client device 110 in response to the request.

The digital component is presented (260). For example, the client device 110 can present the digital component in a digital component slot of a resource for which the digital component was requested.

Figure 3:
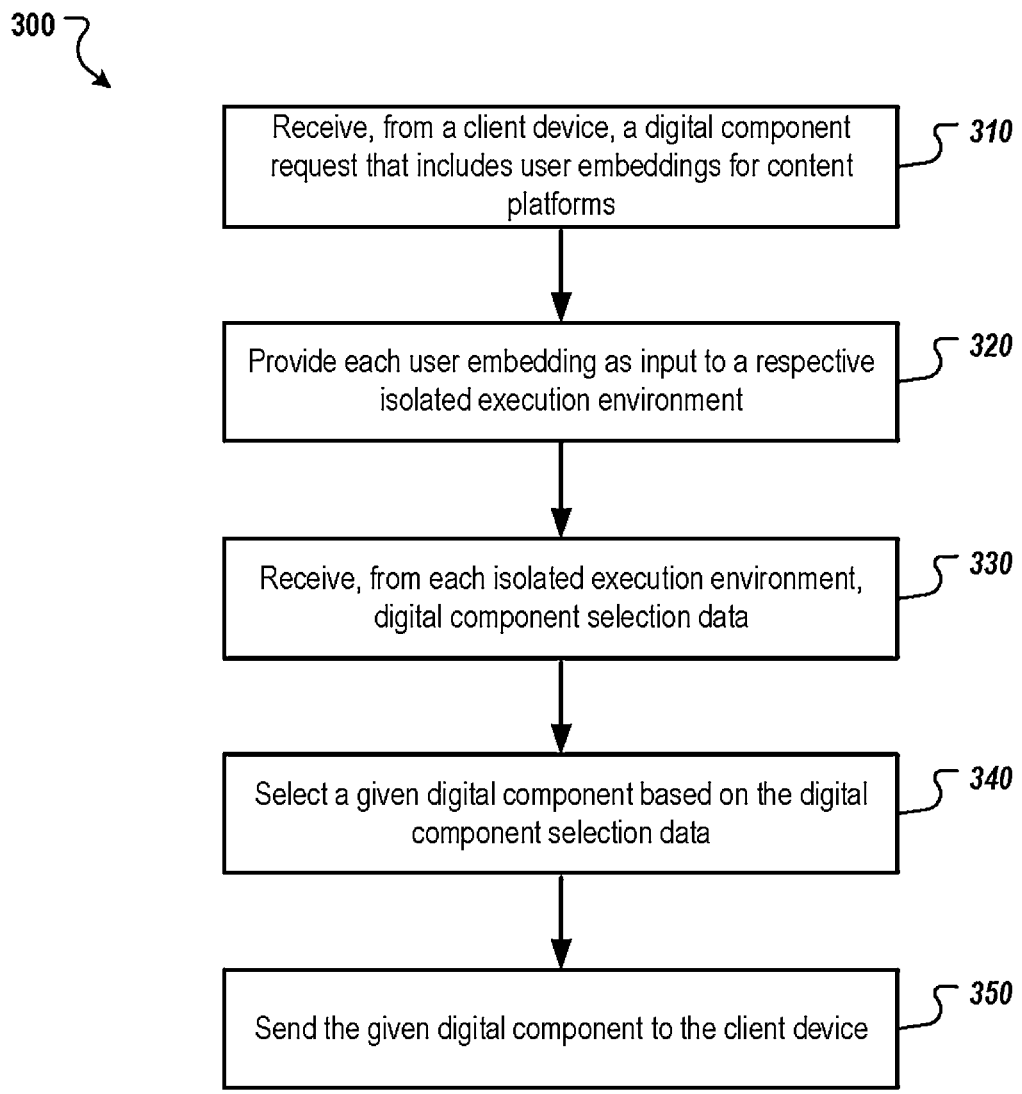
FIG. 3 is a flow diagram of an example process for selecting and providing a digital component for display at a client device in a privacy preserving manner.

FIG. 3 is a flow diagram of an example process 300 for selecting and providing a digital component for display at a client device in a privacy preserving manner. Operations of the process 300 can be performed by a secure distribution system, e.g., the secure distribution system 120 of FIG. 1. Operations of the process 300 can also be implemented as instructions stored on one or more computer readable media, which may be non-transitory, and execution of the instructions by one or more data processing apparatus can cause the one or more data processing apparatus to perform the operations of the process 300.

A digital component request is received (310). The secure distribution system 120 can receive a digital component request from a client device 110. The digital component request can include user embeddings and/or contextual data. The user embeddings can include a respective user embedding for each of multiple different content platforms. As described above, a user embedding can include weights for features and each weight can indicate a relevance of the feature to a user of the client device 110 from which the digital component request was received.

Each user embedding is provided as input to a respective isolated execution environment (320). As described above, the secure distribution system 120 can initiate a secure isolated execution environment for each of multiple content platforms. The isolated execution environment for a content platform can be in the form of a virtual machine that executes selection logic of the content platform. In this example, the secure distribution system 120 can provide the user embedding for a content platform to the virtual machine of the content platform. The virtual machine can execute the selection logic of the content platform using the user embedding to generate digital component selection data. The digital component selection data can include a selection parameter for a candidate digital component.

Digital component selection data is received from each isolated execution environment (330). The secure distribution system 120 can receive the digital component selection data for each of the multiple content platforms from their respective isolated execution environments.

A digital component is selected based on the digital component selection data (340). For example, a selection engine 122 of the secure distribution system 120 can select a digital component from the candidate digital components based on the selection parameters for the candidate digital components.

The selected digital component is sent to the client device (350). In turn, the client device 110 can present the digital component to the user of the client device.

Figure 4:
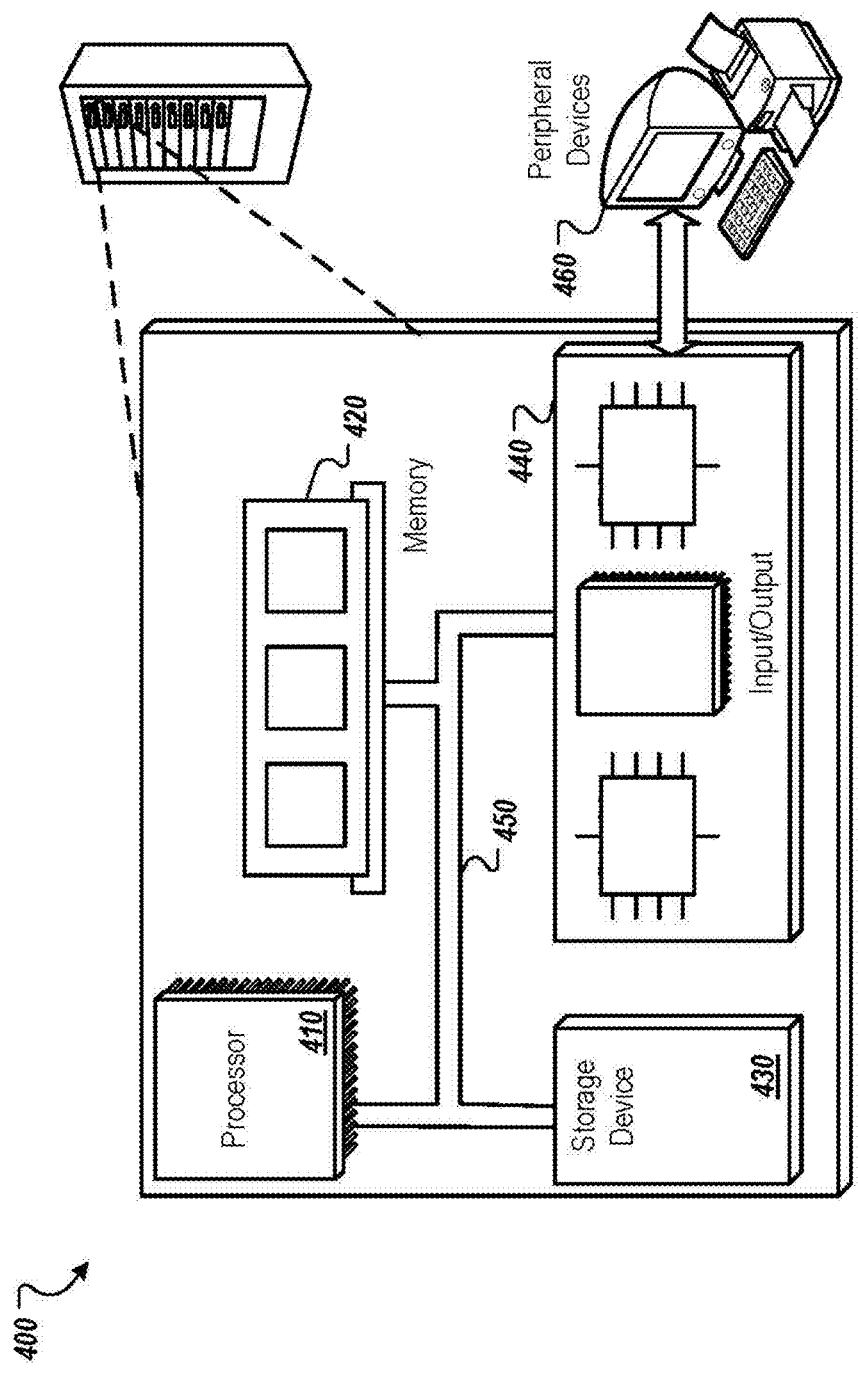
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a secure distribution system and from a client device of a user, a digital component request comprising, for each of multiple content platforms that distribute digital components to users, a corresponding user embedding comprising weights indicative of relevance of multiple features to the user, wherein the user embedding for each content platform is different from the user embedding for each other content platform;

providing, by the secure distribution system, each user embedding as input to a respective isolated execution environment for the content platform corresponding to the user embedding, wherein the secure distribution system hosts each isolated execution environment;

receiving, from each isolated execution environment, digital component selection data generated based on the user embedding provided as input to the isolated execution environment;

selecting, by the secure distribution system, a given digital component based on the digital component selection data received from each isolated execution environment; and sending, by the secure distribution system, the given digital component to the client device for presentation to the user.

2. The computer-implemented method of claim 1, wherein the digital component selection data received from each isolated execution environment comprises data identifying a selection parameter for a candidate digital component.

3. The computer-implemented method of claim 2, wherein selecting the given digital component comprises selecting the digital component from a set of candidate digital components based on the selection parameter received from each isolated execution environment.

4. The computer-implemented method of claim 1, wherein the client device generates each user embedding based on user activity within one or more applications executed by the client device.

5. The computer-implemented method of claim 4, wherein generating the corresponding user embedding for each content platform comprises:
   obtaining, for each event that occurs at the one or more applications, one or more features related to the event;
   obtaining, for each feature, a transformed feature using a transformation function of the content platform; and
   generating, using an aggregation function of the content platform, the user embedding based on the one or more features for each of multiple events.

6. The computer-implemented method of claim 5, wherein the transformation function is configured to transform generic event-based features within a taxonomy of features to content platform specific features of a custom taxonomy of the content platform.

7. The computer-implemented method of claim 5, wherein obtaining the one or more features related to the event comprises providing information related to the event as input to a machine learning model executed by the client device and receiving the one or more features as an output of the machine learning model.

8. The computer-implemented method of claim 5, wherein the transformation function comprises a machine learning model.

9. The computer-implemented method of claim 5, wherein obtaining the transformed feature for each feature comprises sending each feature to one or more retrieval servers and receiving each transformed feature from the one or more retrieval servers.

10. The computer-implemented method of claim 9, wherein the one or more retrieval servers comprises a set of multi-party computation servers and wherein sending each transformed feature comprises sending a respective secret share of each transformed feature to each multi-party computation server.

11. A system comprising:
   one or more processors; and
   one or more storage devices storing instructions that, when executed by the one or more processors, cause the one or more processors to perform operations comprising:
      receiving, by a secure distribution system and from a client device of a user, a digital component request comprising, for each of multiple content platforms that distribute digital components to users, a corresponding user embedding comprising weights indicative of relevance of multiple features to the user, wherein the user embedding for each content platform is different from the user embedding for each other content platform;
      providing, by the secure distribution system, each user embedding as input to a respective isolated execution environment for the content platform corresponding to the user embedding, wherein the secure distribution system hosts each isolated execution environment;
      receiving, from each isolated execution environment, digital component selection data generated based on the user embedding provided as input to the isolated execution environment;
      selecting, by the secure distribution system, a given digital component based on the digital component selection data received from each isolated execution environment; and
      sending, by the secure distribution system, the given digital component to the client device for presentation to the user.

12. The system of claim 11, wherein the digital component selection data received from each isolated execution environment comprises data identifying a selection parameter for a candidate digital component.

13. The system of claim 12, wherein selecting the given digital component comprises selecting the digital component from a set of candidate digital components based on the selection parameter received from each isolated execution environment.

14. The system of claim 11, wherein the client device generates each user embedding based on user activity within one or more applications executed by the client device.

15. The system of claim 14, wherein generating the corresponding user embedding for each content platform comprises:
   obtaining, for each event that occurs at the one or more applications, one or more features related to the event;
   obtaining, for each feature, a transformed feature using a transformation function of the content platform; and
   generating, using an aggregation function of the content platform, the user embedding based on the one or more features for each of multiple events.

16. The system of claim 15, wherein the transformation function is configured to transform generic event-based features within a taxonomy of features to content platform specific features of a custom taxonomy of the content platform.

17. The system of claim 15, wherein obtaining the one or more features related to the event comprises providing information related to the event as input to a machine learning model executed by the client device and receiving the one or more features as an output of the machine learning model.

18. The system of claim 15, wherein the transformation function comprises a machine learning model.

19. The system of claim 15, wherein obtaining the transformed feature for each feature comprises sending each feature to one or more retrieval servers and receiving each transformed feature from the one or more retrieval servers.

20. A non-transitory computer readable medium carrying instructions that, when executed by one or more processors, cause the one or more processors to perform operations comprising:

receiving, by a secure distribution system and from a client device of a user, a digital component request comprising, for each of multiple content platforms that distribute digital components to users, a corresponding user embedding comprising weights indicative of relevance of multiple features to the user, wherein the user embedding for each content platform is different from the user embedding for each other content platform;

providing, by the secure distribution system, each user embedding as input to a respective isolated execution environment for the content platform corresponding to the user embedding, wherein the secure distribution system hosts each isolated execution environment;

receiving, from each isolated execution environment, digital component selection data generated based on the user embedding provided as input to the isolated execution environment;

selecting, by the secure distribution system, a given digital component based on the digital component selection data received from each isolated execution environment; and sending, by the secure distribution system, the given digital component to the client device for presentation to the user.

\* \* \* \* \*